Feb. 24, 1959 W. F. BISHOP 2,874,760
BEAD SEATING DEVICE FOR TUBELESS TIRES
Filed June 9, 1954 3 Sheets-Sheet 1
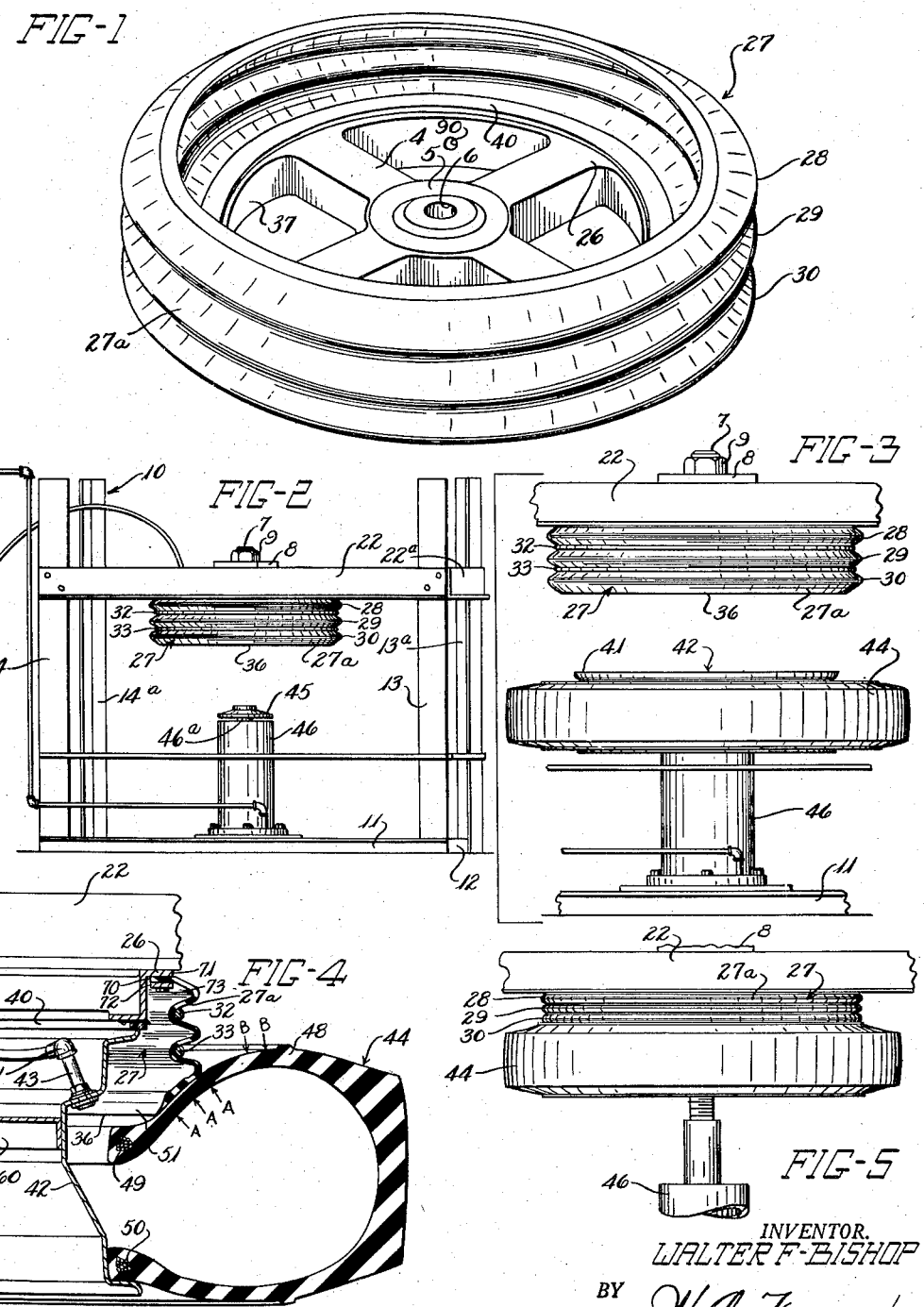
INVENTOR.
WALTER F. BISHOP
BY W. A. Fraser
ATTY

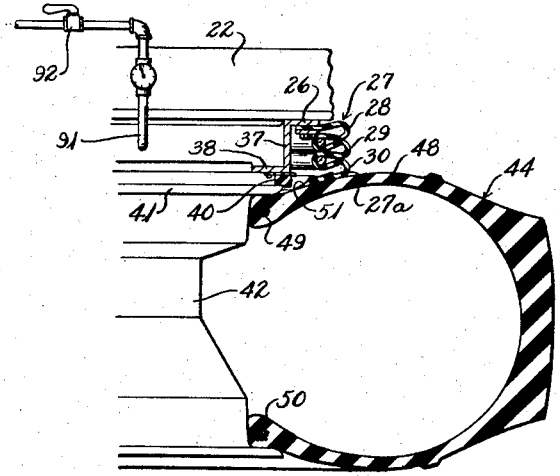
FIG-6
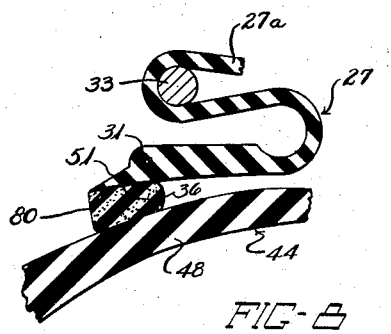
FIG-8
FIG-7
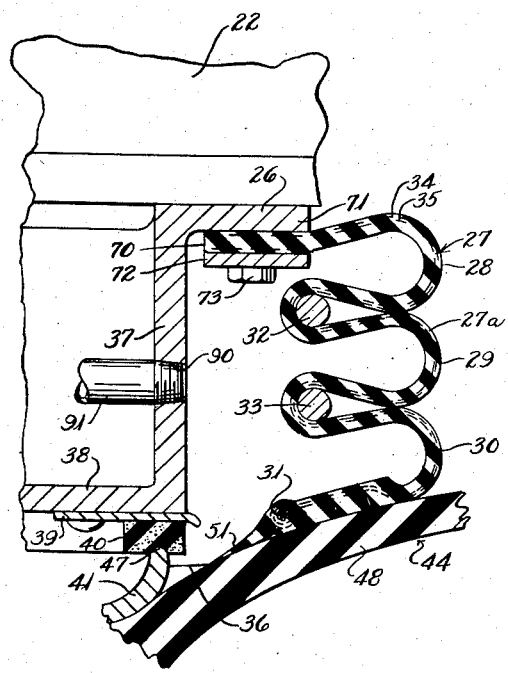
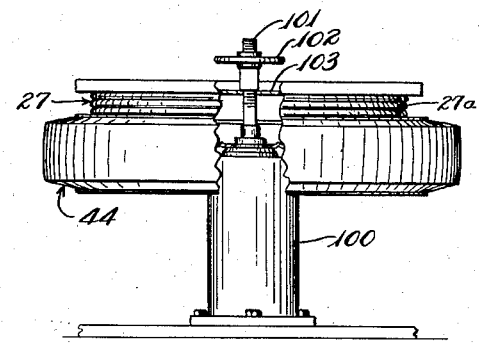
FIG-9
INVENTOR.
WALTER F. BISHOP
BY W. A. Fraser
ATTY.

Feb. 24, 1959  W. F. BISHOP  2,874,760
BEAD SEATING DEVICE FOR TUBELESS TIRES
Filed June 9, 1954  3 Sheets-Sheet 3

INVENTOR.
WALTER F. BISHOP
BY
W. A. Fraser
ATTY.

United States Patent Office 2,874,760
Patented Feb. 24, 1959

2,874,760

BEAD SEATING DEVICE FOR TUBELESS TIRES

Walter F. Bishop, Akron, Ohio, assignor to The Firestone Tire & Rubber Company, Akron, Ohio, a corporation of Ohio Application June 9, 1954, Serial No. 435,486

7 Claims. (Cl. 157—1.1)

The present invention relates to apparatus for and a method of mounting and demounting tubeless tires on and off their rims.

As tubeless tires have come into more general use, the mounting of these tires has presented the industry with a serious problem in that until the present invention, no completely satisfactory means has been found to establish the initial contact of both tire beads with their drop-center tire rim seats. In mounting a tire and just prior to inflation thereof, one or both beads of the tire often do not completely contact the rim bead seats in which event there is an opening between said beads and the rim and inflation of the tire is impossible because the inflationary air escapes as rapidly as it enters the tire.

Heretofore, many expedients to accomplish initial seating of tubeless tire beads have been tried. One of the most successful expendients has been the provision of means comprising a ring of the compressible material, such as sponge rubber, to bridge and substantially seal the opening between the lateral outer edges of a rim flange and a side of a tire being mounted whereby inflationary air entering the tire, for initial tire inflation, was not permitted to readily escape. This sealing resulted in sufficient internal pressure being created in the tire to force the tire beads upon the tire rim bead seats. A modification of the sealing means just described comprised the substitution for the sponge rubber of a flexible tube similar to a tire inner tube. Another modification comprised an annular plate with resilient sealing means to contact the lateral edge of the rim flange and a flexible extension from the plate adapted to contact the side of a tire in such manner as to prevent the escape of air as just explained in connection with the sponge rubber.

Inflating devices employing the sealing means just described had functional limitations consisting of their inability to contact and properly seal between the rim and the sidewall of a tire when a tire being mounted was distorted in such manner that the beads of the tire were pressed closely together which required the sealing means to extend a considerable distance between its supporting ring or plate and the tire. When the condition just described obtained the prior art sealing means, mentioned above, would often not extend a sufficient distance to reach the tire and if they did, the movement of the side of the tire, toward the rim tire bead seat, would compress the sealing means to such an extent that a back pressure against the side of the tire would be created and limit the movement of the tire toward the bead seat which in extreme cases would make it impossible to mount badly distorted tires. Such prior mounting devices were unsatisfactory in tire and rim assembly lines for original equipment in automobile manufactures' plants. In such assembly lines, the occasional failure of the tire mounting equipment was objectionable because of the involuntary interruption of the assembling operation.

The present invention overcomes the faults of the prior art devices by providing a flexible sealing means in the form of a cylindrical bellows that is adapted to reach any required distance necessary to contact the side of the tire and to compress sufficiently to permit the beads of the tire to seat in their final operative position on the rim, without the sealing means creating any objectionable back pressure against the initial movement of the side of the tire toward the rim bead seat.

An object of the present invention is to provide means whereby tubeless tires may be quickly mounted and inflated on their rims without modifying the conventional structure of the tire, or permanently adding any element thereto, said means being inexpensive, highly efficient and reliable.

Another object of the invention is to provide means for mounting tubeless tires that will function properly independent of the initial lateral and radial clearances between the tire beads and the tire rim bead seats.

Another object is to provide means for mounting a tubeless tire that will function regardless of the distortion of the sidewalls of the tire that may occur in normal handling and storage of tires so that said means may be employed in the automatic tire and rim assembly lines of automobile manufacturers with the minimum number of involuntary interruptions of said lines.

A further object is to provide a thin flexible walled closure member adapted to bridge and seal the initial opening between the rim and a tubeless tire just prior to the beads of said tire seating on a tire rim, said closure member being in the general form of a cylinder with convoluted walls and means to prevent said walls from being distorted radially outwardly when the closure member is subjected to internal air pressure.

Yet another object of the invention is to provide a closure member as set out in the next preceding paragraph which will withstand inflationary air pressure as great or greater than the inflationary air pressure the tire has when run in service, said closure member having tire inflationary air inlet means laterally outwardly of a tire rim on which a tire is being mounted so that a predetermined air feed into the tire independent of the inflationary valve disposed in the rim and the mounting and final inflation of the tire may be effected at the same time.

A still further object of the present invention is to provide means for mounting tubeless tires which means are also adapted for demounting tires.

Other objects and advantages of the invention will be apparent to those familiar with the art as the description proceeds.

Referring to the drawings:

Fig. 1 is a perspective view of a closure member embodying the present invention;

Fig. 2 is an elevation of one embodiment of apparatus adapted for use with the present invention;

Fig. 3 is a fragmentary enlarged view of Fig. 2 showing a tubeless tire mounted on its rim and the rim disposed on the ram of a fluid-operated cylinder preparatory to inflating the tire and seating the tire beads;

Fig. 4 is a fragmentary sectional view illustrating the relative positions of the tire, rim and closure member shown in Fig. 3;

Fig. 5 is similar to Fig. 3, except showing a rim, shown in Fig. 2, in raised position pressing the upper side of the tire against the closure member;

Fig. 6 is a fragmentary sectional view similar to Fig. 4, but showing the relative position of the tire, rim and closure member at the completion of the tire inflation;

Fig. 7 is a portion of Fig. 6, but drawn to a larger scale to illustrate the details of structure of the closure member;

Fig. 8 is a partial view of the closure member shown in Fig. 7 except a modified form of the tire contact portion of the closure member is illustrated;

Fig. 9 is an elevation partly in section of a modified form of the actuating and holding mechanism of the tire, rim and closure assembly.

Figure 10:
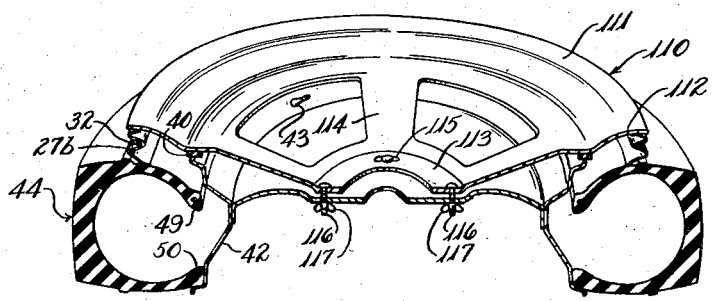
Fig. 10 is a fragmentary perspective view, partly in section, of another embodiment of the invention.

Referring more specifically to the drawings, it will be seen that the apparatus comprises a frame, referred to generally as 10, said frame having base portions 11, 12, upright members 13, 13a and 14, 14a, and cross members 22, 22a bolted to said side members. A closure member, referred to generally as 27, comprises a metallic backing plate 26 having spokes 4, hub 5 with a central hole 6 therein. Hole 6 receives a machine-bolt 7 which extends therethrough and a bolt hole, not shown, in a cross bar 8 mounted on cross members 22, 22a. The threaded end of bolt 7 has a nut 9 threaded thereon whereby the backing plate 26 is securely held by the head, not shown, of bolt 7, in operative position. Backing plate 26 (see Figs. 4 and 7) has attached thereto a hollow accordion member 27a which is of a bellows-type and of substantially the form of a cylinder with thin flexible walls. Referring to Fig. 7, it will be seen that the upper edge 70 of member 27a is retained in fluid tight relation with a radially outwardly extending flange portion 71 of plate 26 by means of a flat ring 72 clamping said edge 70 between ring 72 and portion 71 by means of bolts 73 which extend through ring 72 and portion 70 into the flange 71. Closure member 27 comprises three convolutions 28, 29 and 30. It is to be understood, however, that the invention is not limited to the closure member having exact number of convolutions as obviously any number found satisfactory may be used. The margin 36 of closure 27a, opposite the margin that is bolted to backing plate 26, has disposed therein an inextensible ring 31 which functions to maintain the predetermined diameter of the closure member at that point. Inextensible rings 32 and 33 are removably disposed in the inner convolutes of the closure member 27, as shown in the drawings, where they function to prevent radial expansion of the walls of member 27a. The body portion of the closure member 27 comprises two plies 34 and 35 of rubberized fabric, which fabric may be of any type found satisfactory such as light-weight nylon, rayon, cotton, and may be of cord or square woven fabric construction. It is to be understood that the rubberized fabric plies 34 and 35 have enough rubber to make the closure member substantially impervious to air. The backing plate 26 has an inwardly extending cylindrical portion 37 which terminates axially inwardly in a radially inwardly extending flange 38 which has bolted tightly thereto a plate 39 on which plate 39 is attached, by vulcanization, cementing or any other way found satisfactory, an endless rubber ring 40 which ring is of such diameter, width and thickness as to make an air seal contact with the marginal edge of a flange 41 of a tire rim 42 as will be later explained. A tire inflating valve 43, shown in Fig. 4, is attached to rim 42 for the passing of inflationary air through the rim in the usual manner of inflating tubeless tires.

In operation, a tubeless tire 44 is placed on rim 42 with the beads between the rim flanges in the usual manner of starting the application of a tire to a drop-center rim. After the tire is so mounted on the rim preparatory to the next step in mounting of the tire, the rim with the tire thereon is placed on a ram head 45 of a cylinder 46 illustrated in Fig. 3. Ram head 45 is of the proper size and shape to receive, center and support the bolt-collar portion, not shown, of the disk 60 on which the rim 42 is mounted (see Figs. 4 and 9). Next, an operator, by means of a hand valve not shown, turns fluid pressure back of the ram 46a which causes the ram head to rise and carry the tire and rim upward until the upper edge 47 of the tire rim flange 41 and the upper sidewall 48 of the tire 44 is in air sealing contact with the ring 40 and closure member 27 respectively. The next step is to start the initial inflation of the tire by attaching a conventional air hose chuck 61 to valve 43.

By reference to Fig. 4, it will be seen that the weight of the horizontally disposed tire presses the lower tire bead 50 into contact with the tire rim. It will also be seen by further reference to Fig. 4 that as air enters the tire through valve stem 43, there is equal air pressure within the tire proper and the chamber outside the upper tire bead portion which outside chamber is defined by a portion of rim 42, the closure member 27, and the outer surface of a portion of the tire at its bead portion. The relative air pressures on the opposite sides of the tire sidewall is illustrated by arrows A and B of Fig. 4. Arrows B indicate atmosphere pressure on the outer surface of the sidewall and the arrows A, the initial progressively increasing inflationary pressure on the inner surface of the sidewall and bead portion and on the outer surface of the bead portion which lies radially inwardly from the contact line of the sealing member with the sidewall of the tire. The pressure on both sides of the tire sidewall radially inwardly from the sealing member's contact therewith is equal during initial inflation; however, as inflationary pressure builds up within the tire, this pressure against the inside surface of the tire indicated by A quickly overcomes the atmospheric pressure indicated by the arrows B and the sidewall is forced axially outwardly until the bead 49 of the tire contacts the rim. Since the weight of the tire presses the lower bead 50 into contact with the rim, it will be seen that as soon as the upper bead touches the rim, escape of air between the rim and the tire beads is virtually stopped and the internal pressure within the tire becomes progressively higher and the tire beads 49 and 50 will be forced onto the rim tire bead seats to their operative positions.

As will be seen by again referring to Fig. 4, the convolutions of the member 27a, when the plate 26 is in a horizontal position, normally are expanded to such an extent that the edge portion 36 will be disposed a substantial distance below the point of attachment of the closure member to plate 26. It is to be understood that the distance edge portion 36 is normally removed from the attachment of closure member 27a to plate 26 may be increased by increasing the cylindrical length of member 27a and forming its wall into additional convolutions. It is also to be understood that if found desirable, the marginal edge portion 36, or adjacent thereto, may be supplied with weights in order to insure the unfolding of the convolutions and to make more positive contact of margin 36 with the side of the tire. In one embodiment of the invention, margin 36 terminates in a thin edge fin 51 as will be seen by reference to Fig. 7, and it is to be understood that this thin edge is functional in the sense of forming a flutter valve, said thin edge fluttering against the side of the tire when inflationary air passes between it and the side of the tire during the initial inflation of the tire.

It will now be seen that the present invention provides a closure member that will have sufficient width to contact the side of a tire mounted on its rim preparatory to initial inflation of the tire regardless of how badly distorted the tire may become in shipping and storage. The walls of member 27a being flexible and formed into convolutions, such wall would normally be expanded radially outwardly when subjected to the internal inflationary pressure of a tire and to prevent such expansion of said walls, applicant has, as indicated hereinabove, provided substantially inextensible rings 32 and 33 which are disposed outside the wall of the closure member and in the inwardly turned convolutions thereof. While rings 32 and 33 are preferably formed of metal, it is to be understood that they may be composed of any material found satisfactory such as a ring of rubber reinforced with substantially inextensible material as, for example, a plurality of cords such as the cords of tire fabric. Referring now to Figs. 4 and 6, it will be seen that the peculiar construction of applicant's closure member 27 permits movement of the edge portion 36 through the maximum distance that is necessary to permit the present mounting device to operate successfully on any tire that would normally come to a tire and rim assembly line. While provision has been made for the travel of edge portion 36 as just explained, the thin wall bellows-like construction of member 27a compresses axially into such small space as to permit full compression of the closure member walls as shown in Fig. 6 without substantial resistance to compression or creating back pressure against the side of the tire being mounted.

Referring again to the drawings and particularly to Fig. 7, it will be seen that an orifice 90 is formed through the rigid cylindrical portion 37 of backing plate 26. This orifice is for passing inflationary air through plate 26 and to that end it is connected to a pipe 91 which in turn it connected with a suitable source of air pressure. A valve 92 (see Fig. 6) is disposed in air line 91 to turn the inflationary air on and off as the tire mounting operation requires. The purpose and advantage of passing air through the orifice 90 is to make fast initial inflation of the tire possible. Inflation of a tire through an inner tube valve such as 43 is necessarily slow due to the sizes of such valves and the presence of the valve mechanism in the valve stem. While inflation of the tire through a conventional inner tube valve stem is satisfactory for the mounting of tubeless tires in tire service stations, it is desirable that the operation be speeded up when such tires are to be mounted in the assembly line of an automobile manufacturer.

It will be obvious to those familiar with the art of mounting and inflating tires that the present invention may be practiced entirely automatically in a tire and rim assembly line. Thus, tires and automobile wheels including the tire rims may be intermittently fed to a tire mounting unit where the tires are automatically mounted on the rims with the tire beads between the rim tire flanges, but not on the rim bead seats. Next, the wheel and tire may be delivered to a tire inflating station where applicant's mounting device, described hereinabove, may be automatically brought into operative contact with the tire and rim and valve 92 automatically opened to pass inflationary air through orifice 90 to quickly seat the tire beads on the rim bead seats, after which an air hose chuck, such as 61, may automatically be brought into operative contact with valve stem 43 and the inflation of the tire completed therethrough.

Applicant has discovered, and it is an important feature of the invention, that the inflation pressure of the tire required for the tire when it is run in service may be obtained concurrently with the tire mounting. This is accomplished by inflating through air line 91 to a somewhat higher pressure than the ultimate tire pressure desired and then permitting a rapid discharge of air from the tire to the atmosphere through said air line. For example, but without limitation, the inflationary pressure in an 8.00–15 size passenger tire mounting operation may be raised to 34# and then the confined air suddenly expose to the atmosphere through line 91. This exposure causes a rush of air out of the tire past the beads resulting in the tire beads being snapped onto the tire rim bead seats in their proper operative position and thereby traps such volume of compressed air within the tire as to create an internal tire pressure of approximately 30#. In the step just described where 34# is initially fed into the tire, it may be in some cases that the tire beads contact the rim before the air is released through line 91. However, that may be, it is certain that upon sudden release of the air through line 91 the beads are quickly forced to their proper operative position relative to the rim. By a few tests, the initial inflationary pressure to be used for any particular size and type of tire to obtain the final inflation pressure desired can be established.

Obviously, this last described method obviates the need of inflating through the regular valve stem 43 and, therefore, in an assembly line where tires are automatically mounted on rims and the tire beads automatically seated on the rim bead seats by differential fluid pressure feed through line 91 to trap the ultimate, the manual control of the operation of inflating the tire through stem 43 may be eliminated by the simple expedient of well known cycle control mechanism to start inflation through line 91 when plate 26 has reached a predetermined relative position with the tire rim and to open the line, to the atmosphere when a given inflationary pressure has been reached. Since such control mechanisms are common and within the skill of the art, a detailed description of same is considered to be unnecessary.

Another use for the embodiment of the invention shown in Figs. 6 and 7 is the demounting of tires whether tubeless or not. Frequently, after prolonged use in service, tires become so tightly attached to the rims that they are said to be frozen to the rim. This condition results from rusting, tight bead fit to rims, etc. When this frozen condition develops, it is difficult to remove the tires even with the best of tire tools heretofore available. The present apparatus breaks such frozen beads loose from the rims by simply deflating the tire and placing the tire and rim in the apparatus of Fig. 2 as shown in Fig. 5, when the various elements will occupy the relative positions shown in Fig. 6. Next, compressed air is turned into line 91 forcing the bead away from its seat as shown in Fig. 4. It is to be understood that the inextensible rings 32, 33 reinforce the thin wall of member 27a so that it will withstand the high pressure that will be necessary to blow or force the tire bead from its seat on the rim. The tire may be turned over and replaced in the apparatus to break the other bead loose from its rim seat.

Another important embodiment of the invention is shown in Fig. 8 wherein an endless ring 80 of cellular rubber has been permanently attached to the margin 36 of member 27a. Ring 80 may be attached to the wall of member 27a by cement, cement and vulcanization or in any manner found satisfactory. The tire contact surface of ring 80 is soft enough to permit the lettering or other irregularities on the surface of the sides of a tire to embed therein without bridging of the material of which the ring 80 is composed. Applicant prefers to use a type of cellular rubber for ring 80 which has communicating cells so that it is not completely impervious to air. By using this type of material for ring 80, applicant has found that sufficient inflationary air pressure can be created within the tire to cause the mounting apparatus to function properly while at the same time, air will pass through ring 80 fast enough to substantially deflate the air chamber defined by applicant's apparatus after said tire is mounted in its ultimate position on the rim, to prevent any objectionable sudden discharge of air from said chamber when the closure member is removed from the tire and rim.

The mounting device described hereinabove is peculiarly adapted for use in the tire and rim assembly line of an automobile manufacturer, but it is to be understood that the closure member 27 and rim contact member 40 could be mounted on any suitable backing and used in tire service stations for mounting tires. One embodiment of such a device is shown in Fig. 9 which operates essentially in the same manner as does the embodiment explained in connection with Figs. 2, 4 and 5. However, where such raising means as shown in Fig. 1 is not available, a stand 100, such as shown in Fig. 9, may be used and a threaded bar 101, with a nut 102 in the form of a wheel with an internally threaded hub, may be used to press a plate 103, similar to plate 71 of Fig. 7, to bring it into contact with the upper portion of the tire in the same manner as was explained in connection with Figs. 2, 4, and 5.

Another embodiment of the invention is illustrated in Fig. 10 wherein a closure member referred to generally as 110 is adapted to be carried in the trunk of an automobile and for use where such apparatus as shown in Figs. 2 and 9 are not available.

Closure member 110 comprises a rigid plate 111 having a wide air impervious marginal portion 112, a hub portion 113 and spoke-like members 114 connecting the hub portion and said marginal portion. The plate 111 is preferably composed of thin strong metal and may be stamped or otherwise fabricated. As will be seen by reference to Fig. 10, plate 111 is so formed that its said impervious edge portion overlies and extends radially outwardly of the radial and lateral outer edge 47 of a tire rim 42 on which a tubeless tire 44 is being mounted. The plate 111 is provided with a hollow cylindrical axially extensible and collapsible thin accordion walled closure element 27b reinforced against radial distortion by inextensible ring 32, said element 27b being substantially of the same construction and functions in the same manner and for the same purpose as the axially movable member 27a of Fig. 7. A sealing ring 40 of rubber-like material is attached to plate 111 and is adapted to make air tight contact with said edge 47 of rim 42 in the same manner and for the same purpose as explained relative to ring 40 shown in Fig. 7. The plate 111 is dished from its marginal portion 112 so that its central or hub portion 113 contacts or closely approaches the bolt-flange portion of the wheel of which rim 42 is a part. The central portion 113 of said plate has bolt holes or slots 115 therethrough which holes are so disposed that they are conveniently aligned with bolt holes in the bolt-flange of the wheel and bolts 116 may be projected through holes 115 and the wheel bolt holes whereby the wheel and plate 111 may be firmly bolted together by nuts 117 on said bolts. The dimensions of plate 111 and rim 42 is such that when the plate and wheel are bolted as shown in Fig. 10, the ring 40 contacts said edge 47 and member 27b is in operative position in contact with the side of tire 44. With these members just mentioned disposed as shown in Fig. 10 the beads of tire 44 may be forced to their operative position on the rim tire bead seats by inflating the tire through a valve 43 by means of a tire hand pump, or an air chuck in communication with a source of air pressure in a tire service station, the closure member 110 functioning in the same manner as that shown in Figs. 4 and 7, except, it is to be noted, that no passage for inflationary air through plate 111 is provided and the inflationary air used for mounting the tire must enter through the valve 43. After said tire beads are properly seated the tire inflation may continue until the desired inflation pressure is effected. The plate 111 may next be unbolted and removed from the said wheel and conveniently carried with a spare wheel in a car trunk, or set aside for future use.

While the operation of the invention has been explained in reference to four embodiments of closures applied to the top of the tire lying horizontally, it is to be understood that the invention is not to be limited to such sealing members alone as obviously the tire of Fig. 4 could lie upon a second closure member of the same or similar construction to that of closure members described if it were found desirable. Applicant also points out that the tire and rim may be in a vertical position, that is, with their axis horizontal preparatory to the final step of mounting. In this latter case, it is preferred to use a sealing closure member such as 27 on each side of the assembly, the closure members being applied either manually or mechanically depending on the number of tires to be mounted and the speed desired.

The detailed description of the particular embodiments of the invention illustrated and described herein is not to be construed as limiting the invention thereto. The invention includes all features of patentable novelty residing in the foregoing description and the accompanying drawings.

What is claimed is:

1. In a tubeless tire mounting device, a bead seating mechanism, said mechanism comprising a thin, flexible body portion substantially in the form of a hollow cylinder, the walls of said body having at least one circumferentially extending convolution thereabout with an inextensible ring disposed in a fold of a said convolution, said ring being adapted to prevent radial outward expansion of said body; said body being axially collapsible and expandible; said body having one end attached in fluid tight relation to a rigid plate and having its other end in removable substantially air tight contact with the outer surface of the sidewall of a tire being mounted on a tire rim; said plate having attached thereto means for effecting a removable air tight seal with a radial outer edge of a flange of said tire rim adjacent the side of the tire with which said flexible body is in contact; said body, plate and sealing ring forming a closure member enclosing the space between the bead portion of said tire and rim when the beads of such tire are disposed between the flanges of said rim and before a said bead adjacent said mounting device has made contact with the tire bead seat of said rim.

2. In a tubeless tire mounting device a bead seating mechanism, said mechanism comprising a thin, flexible body portion in the form of a hollow cylinder, the walls of said body having at least one circumferentially extending convolution entirely thereabout with a relatively inextensible ring disposed in a fold of said convolution, said ring being adapted to prevent radial outward expansion of said body; said body being freely axially collapsible and expandible through the medium of said convolutions; said body having one end attached in fluid tight relation to a rigid plate and having its other end terminating in a radially inwardly extending thin edge adapted to make temporary air tight contact with the outer surface of the sidewall of a tire being mounted on a tire rim; the edge portion of said body adjacent said thin edge having disposed therein an endless inextensible ring adapted to weight and to prevent radial movement of said thin edge portion; said plate having attached thereto a sealing ring of rubber-like material adapted to contact and form an air tight seal with a radial outer edge of a flange of said tire rim adjacent the side of the tire said body is adapted to contact; said body, plate and sealing ring forming a closure member adapted to close the space between the bead portion of a tire and a rim on which a tire is being mounted when the beads of such tire are disposed between the flanges of said rim and before a said bead has made contact with the tire bead seat of said rim leaving a space therebetween.

3. In a tubeless tire mounting device a bead seating mechanism, said mechanism comprising means for bridging the space between the lateral outer edge of a tire rim and adjacent side of a tubeless tire being mounted on said rim; said means comprising a rigid and an axially collapsible and axially expandable wall joined at one of their edges in fluid tight relation the free edges of, said rigid and collapsible walls having means to make temporary substantially fluid tight contact with said lateral outer edge of said rim and the side of said tire respectively; said rigid member having an opening therethrough; an air line connected to a source of air pressure communicating with said opening and having a valve disposed in said air line, whereby inflationary air may be freely passed through said rigid wall into a chamber defined by said tire, rim and walls.

4. In a tubeless tire mounting device a bead seating mechanism, said mechanism comprising means for bridging the space between the lateral outer edge of a tire rim of a wheel assembly and an adjacent side of a tubeless tire being mounted on said rim; said means comprising a rigid and an axially collapsible and axially expandible wall joined at one of their edges in fluid tight relation the free edges of, said rigid and collapsible walls having means to make temporary substantially fluid tight contact with said lateral outer edge of said rim and the side of said tire respectively, said rigid wall being in the form of a plate with a center portion depressed toward the center of said wheel when said device is in operative position, the center portions of said rigid wall having holes aligned with the bolt holes in the wheel whereby said device and said wheel may be removably bolted together during a tire mounting operation.

5. In a tubeles tire mounting device a bead seating mechanism, said mechanism comprising means for bridging the space between the lateral outer edge of a tire rim of a wheel assembly and an adjacent side of a tubeless tire being mounted on said rim; said means comprising a rigid and an axially collapsible and axially expandible wall joined at one of their edges in fluid tight relation the free edges of, said rigid and collapsible walls having means to make temporary substantially fluid tight contact with said lateral outer edge of said rim and the side of said tire respectively, means for removably attaching said device to said wheel in operative position relative thereto.

6. In a tubeless tire mounting device, a bead seating mechanism, said mechanism comprising a thin, flexible body portion in the form of a hollow cylinder, the walls of said body having at least one circumferentially extending convolution extending completely thereabout; an inextensible ring disposed in the base portion of a fold of a said convolution; the axially inner end of said device being formed to make a removable substantially air tight contact with the outer surface of a sidewall of a tire being mounted on a tire rim; the other end of said cylinder being attached in air tight relation to a substantially rigid member which member is formed with means to make a removable air tight contact with said rim.

7. Apparatus for inflating a tubeless tire on a tire rim when one of the beads fails to make sealing contact with the corresponding rim seating surface, comprising a thin flexible body portion in the form of a hollow cylinder, the walls of said body having at least one circumferentially extending convolution extending completely thereabout; an inextensible ring disposed in the base portion of a fold of a said convolution; the axially inner end of said body being formed to make a removable substantially air tight contact with the outer surface of a sidewall of a tire being mounted on a rim; the other end of said cylinder being attached in air tight relation to a substantially rigid member which member is formed with means to make a removable air tight contact with said rim and means in said rigid member for admitting fluid under pressure into said cylinder.

References Cited in the file of this patent

UNITED STATES PATENTS

| | | |
|---|---|---|
| 711,212 | Honiss | Oct. 14, 1902 |
| 965,076 | Carle | July 19, 1910 |
| 1,295,471 | Fleury | Feb. 25, 1919 |
| 1,601,705 | Staunton | Sept. 28, 1926 |
| 1,966,580 | Bull | July 17, 1934 |
| 2,102,949 | Gammeter | Dec. 21, 1937 |
| 2,304,581 | Lyon | Dec. 8, 1942 |
| 2,406,771 | Hughes | Sept. 3, 1946 |
| 2,482,780 | Kirby | Sept. 27, 1949 |
| 2,615,506 | Wilson | Oct. 28, 1952 |